(12) United States Patent
Priebatsch

(10) Patent No.: US 8,639,619 B1
(45) Date of Patent: Jan. 28, 2014

(54) SECURE PAYMENT METHOD AND SYSTEM

(71) Applicant: Seth Priebatsch, Boston, MA (US)

(72) Inventor: Seth Priebatsch, Boston, MA (US)

(73) Assignee: SCVNGR, Inc., Boston, MA (US)

( * ) Notice: Subject to any disclaimer, the term of this patent is extended or adjusted under 35 U.S.C. 154(b) by 0 days.

(21) Appl. No.: 13/718,466

(22) Filed: Dec. 18, 2012

Related U.S. Application Data

(60) Provisional application No. 61/671,381, filed on Jul. 13, 2012.

(51) Int. Cl.
G06Q 40/00 (2012.01)
(52) U.S. Cl.
USPC .......................................................... 705/39
(58) Field of Classification Search
None
See application file for complete search history.

(56) References Cited

U.S. PATENT DOCUMENTS

2008/0319905 A1* 12/2008 Carlson ........................... 705/44
2009/0281948 A1* 11/2009 Carlson ........................... 705/44

* cited by examiner

Primary Examiner — Jason M Borlinghaus
(74) Attorney, Agent, or Firm — Bingham McCutchen LLP

(57) ABSTRACT

Representative embodiments of a server-based method of facilitating payment by a user registered with the server include, at the server, generating and storing, for the user, a code readable by a merchant device, transmitting the code to a mobile device of the user, facilitating provision of information characterizing a payment instrument from the user to a payment-processing entity without storing the data at the server, receiving, from the payment-processing entity, a token indicative of the payment instrument but not encoding data that would enable use of the instrument, associating the token with the user, receiving, from a merchant, the code and a payment amount, matching the received code to the user and retrieving the token associated with the user, and providing the token and the payment amount to the payment-processing entity to facilitate completion of a transaction between the user and the merchant.

14 Claims, 7 Drawing Sheets

| User |
|---|
| able_to_refer *boolean* •
admin *boolean* •
bom_at *datetime*
braintree_customer_id *string*
credit_amount *integer* •
credit_cards_count *integer* •
credit_currency_code *string* •
day_after_first_order_reengaged_at *datetime*
email *string (100)* •
employee *boolean* •
employer *string*
encrypted_password *string (128)* •
enrolled_in_employee_rewards_at *datetime*
exploding_credit_added_at *datetime*
exploding_credit_removed_at *datetime*
facebook_access_token *string*
facebook_user_id *string*
failed_logins_count *integer* •
first_name *string (50)* •
gender *string*
last_name *string (50)* •
last_order_created_at *datetime*
lat *decimal (15, 6)*
lng *decimal (15, 6)*
mooth_after_last_order_reengaged_at *datetime*
orders_count *integer* •
password_reset_at *datetime*
paused *boolean* •
percent_donation *decimal (6, 5)*
phone *string* •
referral_credit_added_at *datetime*
regenerate_code *boolean* •
salt *string (128)* •
ssn *string* •
subscriber *boolean* •
subscription_token *string* •
two_weeks_after_first_order_reengaged_at *datetime*
week_after_registration_reengaged_at *datetime* |

| UserAddress |
|---|
| address_type *string* •
extended_address *string*
locality *string* •
postal_code *string* •
region *string* •
street_address *string* • |

| UserEmailAudit |
|---|
| email_address *string* • |

| Location |
|---|
| extended_address *string*
lat *decimal (15, 6)* •
lng *decimal (15, 6)* •
locality *string* •
payment_emails *text*
payment_type *string*
phone *string*
postal_code *string* •
region *string*
street_address *string* • |

FIG. 3B

SECURE PAYMENT METHOD AND SYSTEM

CROSS-REFERENCE TO RELATED APPLICATION

This application claims priority to and the benefit of, and incorporates herein by reference in its entirety, U.S. Provisional Patent Application No. 61/671,381, which was filed on Jul. 13, 2012.

FIELD OF THE INVENTION

In various embodiments, the present invention relates generally to systems and methods for ensuring secure payment transactions.

BACKGROUND

Traditional methodologies for making payments utilize paper instruments, such as cash or checks, and electronic transactions, such as credit or debit cards. Paper instruments advantageously allow a full payment to be completed immediately at the point of sale without the need for any further exchange after the good or service has been delivered. When the transferred funds are large, however, paper instruments may not be practical. In addition, the fear of theft or loss discourages possession of paper instruments. Electronic transactions developed successfully due to the advent of secure data systems and networks that permit payments made to vendors at the point of sale without physical transfer of paper currency. Electronic transactions thus greatly increase consumer convenience, especially when the transacted commerce is large. Electronic commerce, however, generally requires fixed, immobile infrastructure (such as automated teller machines (ATMs), shared banking networks, or point-of-sale (POS) terminals) that may sometimes be inaccessible. In addition, although completion of a transaction typically requires the physical presence of the consumer—who may be asked to authenticate himself, present a physical token and/or provide a signature to a merchant or bank—fraudulent use of the physical tokens (e.g., credit and debit card numbers) still occurs frequently.

Widespread usage of computationally advanced mobile telecommunication devices can potentially extend the reach of electronic transactions. Because a mobile payment (or "m-payment") may directly initiate, authorize, and confirm an exchange of financial value in return for goods and services, the need for consumers to carry paper instruments or physical tokens and/or access immobile infrastructure is minimized. Existing m-payment approaches typically create a transaction flow in which a consumer presents payment data to a merchant who then presents it to a payment processor; the customer data (e.g., a credit-card or debit-card number) required to transact the payment is stored directly on a physical medium (e.g., credit cards) or digitally on network-accessible servers (e.g., Google wallet or a secured near-field communication (NFC) mobile wallet). At each stage of this traditional m-payment, however, the collectively stored consumer data is accessible and vulnerable to compromise.

Securing customers' privacy during payment transactions is of paramount importance; even a few instances of customers suffering a financial loss may destroy the marketplace viability of an m-payment scheme. Because conventional m-payments workflows store the identity and financial account information of the user within a single organization or server cluster, the central store of sensitive data provides a tempting target to malicious "hackers," who circumvent security measures and steal payment credentials. Such violations have been fairly common in Internet-based commerce; many consumers have experienced identity theft when information is stolen from an entity that maintains financial accounts. As a result, adoption of mobile devices that facilitate m-payments has been limited by security concerns; these security concerns have discouraged users from signing up for m-payment procedures that require registration or provide personal information to the system infrastructure.

Consequently, there is a need for an approach that is conveniently implemented and used, but which can securely transact payments for goods or services using a mobile device.

SUMMARY

In various embodiments, the present invention facilitates secure mobile payments by distributing storage of the transaction-enabling data elements, including the customer's identity and information about the payment instrument, among unrelated parties. Because the customer's data is stored by multiple parties, unauthorized access to the records of any single party in the transaction flow will not enable a thief to "spoof" the user's identity and initiate transactions under his name. In addition, the customer's information may be distributed so that various parties directly involved in a payment transaction receive no information about the customer's information stored by other parties. The parties that are involved in a payment transaction thereby cannot store any payment-relevant information transmitted from other parties. For example, in a "triple blind" payment system, none of the paying party (i.e., the customer), the party receiving the payment (i.e., the merchant), or the party facilitating the payment (i.e., the identity and payment manager) possesses both the customer's identity and the underlying payment instrument (e.g., a credit-card or debit-card number) or any data that could be used to reverse engineer or "spoof" the instrument. Accordingly, the customer's identity and privacy is highly secure and the possibility of financial losses for the customer is minimized during a mobile-payment transaction.

Accordingly, in one aspect, the invention pertains to a server-based method of facilitating payment by a user registered with a server. In representative embodiments, the method includes, at the server, generating and storing, for the user, a code readable by a merchant device; transmitting the code to a mobile device of the user; facilitating provision of information characterizing a payment instrument from the user to a payment-processing entity without storing the data at the server; receiving, from the payment-processing entity, a token indicative of the payment instrument but not encoding data that would enable use of the instrument; computationally associating the token with the user; receiving, from a merchant device, the code and a payment amount; matching the received code to the user and retrieving the token associated with the user; and providing the token and the payment amount to the payment-processing entity to facilitate completion of a transaction between the user and the merchant.

The code may be a QR code, a bar code, a radio-frequency identification, a near-field-communication signal, an audio signal, and/or an infrared signal. Additionally, the code may be a seed code that can further generate a unique "mature" code readable by a merchant device. The code may be reset, by the server, after a predetermined period of time or upon receiving a request, by the server, from the user. In one embodiment, the code is transmitted from the server to the mobile device via wireless cell phone communication, Internet, ultrasound, Bluetooth, or near-field communication.

In various embodiments, the server includes a database for storing records, a database record being associated with the user and including user-identifying information, the code or a seed therefor, and the token. In some embodiments, the mobile device is selected from the group including a cellular phone, a smart phone, a computer, a personal digital assistant (PDA), an Internet Protocol Television and an electronic gaming device.

In another aspect, the invention relates to a server for facilitating payment by a user registered with the server. In various embodiments, the server includes a processor; a processor-executable code-generation module for generating, for the user, a code readable by a merchant device; a communication module; a web server for generating a form-containing web page and associated programming for execution on a client-side computer; and a database for storing a token received from the payment-processing entity via the communication module and associating the token with the user. The programming may be executable to cause transmission of information entered on the form to a payment-processing entity without storing the data at the server. In various embodiments, the processor is configured to (i) operate the communication module to cause the code to be transmitted to a mobile device of the user, (ii) operate the communication module to receive, from a merchant, the readable code and a payment amount, (iii) match the received readable code to the user and retrieving the token associated with the user, and (iv) following the match, operate the communication module to provide the token and the payment amount to a payment processor to facilitate completion of a transaction between the user and the merchant.

The code may be a QR code, a bar code, a radio-frequency identification, a near-field-communication signal, an audio signal, and/or an infrared signal. In addition, the code may be a seed code for generation, by the code-generating module, a unique mature code readable by a merchant device. The code may be reset by the code-generation module after a predetermined period of time or upon receiving a request from the user.

In various embodiments, the transmitted form is configured to receive information characterizing a payment instrument. The database includes a series of stored records, each record being associated with a user and including user-identifying information, the code or a seed therefor, and the token. In some embodiments, the communication module transmits the code from the server to the mobile device via wireless cell phone communication, Internet, ultrasound, Bluetooth, or near-field communication.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which:

FIG. 3B depicts a user record including various information that uniquely identifies the user.

DETAILED DESCRIPTION

Figure 1:
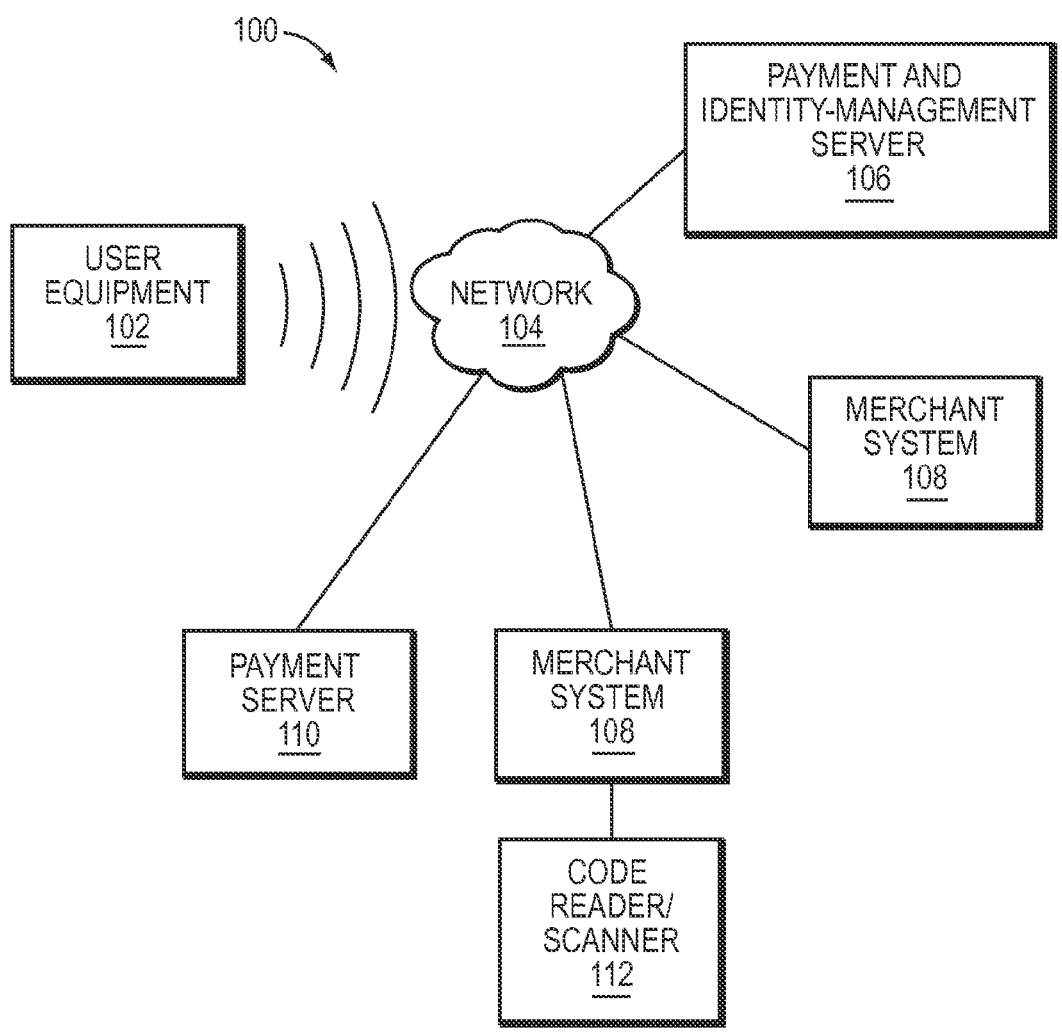
FIG. 1 is a block diagram of an exemplary network in accordance with an embodiment of the invention.

Refer first to FIG. 1, an exemplary mobile-payment transaction network 100 includes user equipment (e.g., a mobile device) 102 linked to a network 104 (e.g., a cellular telephone network, the Internet, or any wide-area network or combination of networks capable of supporting point-to-point data transfer and communication) of various interconnected devices to support wired, wireless, or any two-way communication. The network 104 connects various devices, including a payment and identity-management server 106, one or more merchant systems (e.g., POS terminals) 108, and a payment server 110 utilizing, again, wired, wireless, or any two-way communications. Each merchant system 108 may be associated with a merchant who offers goods or services for sale to the user possessing the mobile device 102. In one embodiment, the merchant system 108 is a point-of-sale (POS) system (e.g., an electronic cash register) that connects to a code reader or scanner (hereafter "reader") 112. The reader 112, may be capable of reading and/or decoding, for example, a barcode, a radiofrequency identification (RFID) code, or a "Quick Response" (QR) code, and/or receiving signals, such as NFC signals, audio signals, or infrared signals. In addition, the reader 112 may be mobile or physically associated with the merchant system 108. The payment server 110 may be operated by a payment-processing entity responsible for authenticating and actually performing the payment transaction. For example, a so-called "direct" payment processor represents the financial-processing backend provider to credit-card issuers and payment services such as PAYPAL. An "indirect" payment processor is an independent entity processing transactions for multiple payment services and maintains its own records and data.

Figure 2A:
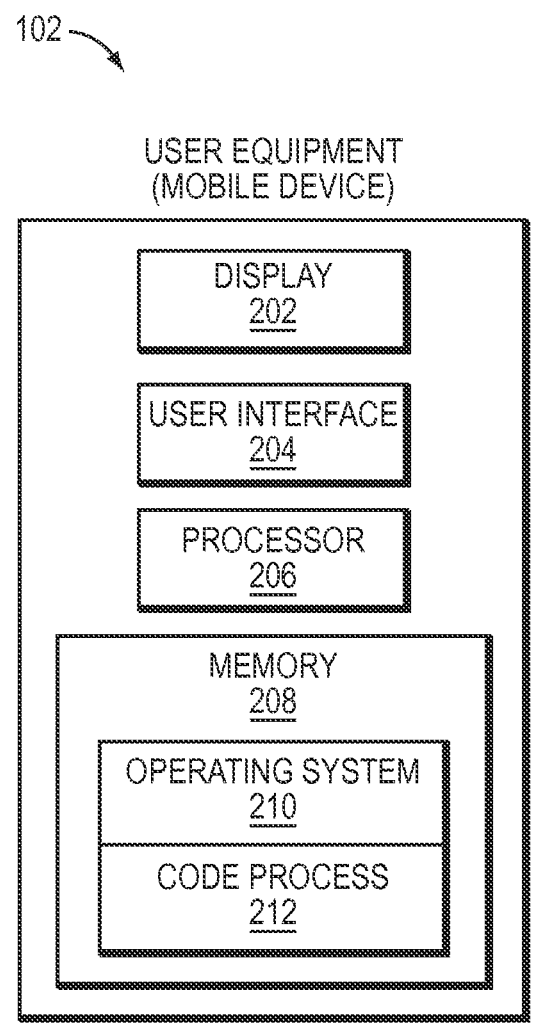
FIGS. 2A and 2B are block diagrams of an exemplary mobile device and management server, respectively, in accordance with an embodiment of the invention.

Referring to FIG. 2A, in various embodiments, the mobile device 102 includes a conventional display 202, a user interface 204, a processor 206, and a memory 208. The memory 208 includes an operating system (OS) 210, such as GOOGLE ANDROID, NOKIA SYMBIAN, BLACKBERRY RIM or MICROSOFT WINDOWS MOBILE, and a code process 212 that implements the device-side functions as further described below. The mobile device 102 alone may not require a network to be used in the context of the present invention. In addition, additional transactional information may be embedded in the code process 212 for transmission through the network 104 for later processing on a back-end server (e.g., the payment server 110). As used herein, the term "mobile device" used for transacting a mobile payment refers to a "smart phone" or tablet with advanced computing ability that, generally, facilitates bi-directional communication and data transfer using a mobile telecommunication network, and is capable of executing locally stored applications and/or payment transactions. Mobile devices include, for example, IPHONES (available from Apple Inc., Cupertino, Calif.), BLACKBERRY devices (available from Research in Motion, Waterloo, Ontario, Canada), or any smart phones equipped with the ANDROID platform (available from Google Inc., Mountain View, Calif.), tablets, such as the IPAD and KINDLE FIRE, and personal digital assistants (PDAs).

Figure 2B:
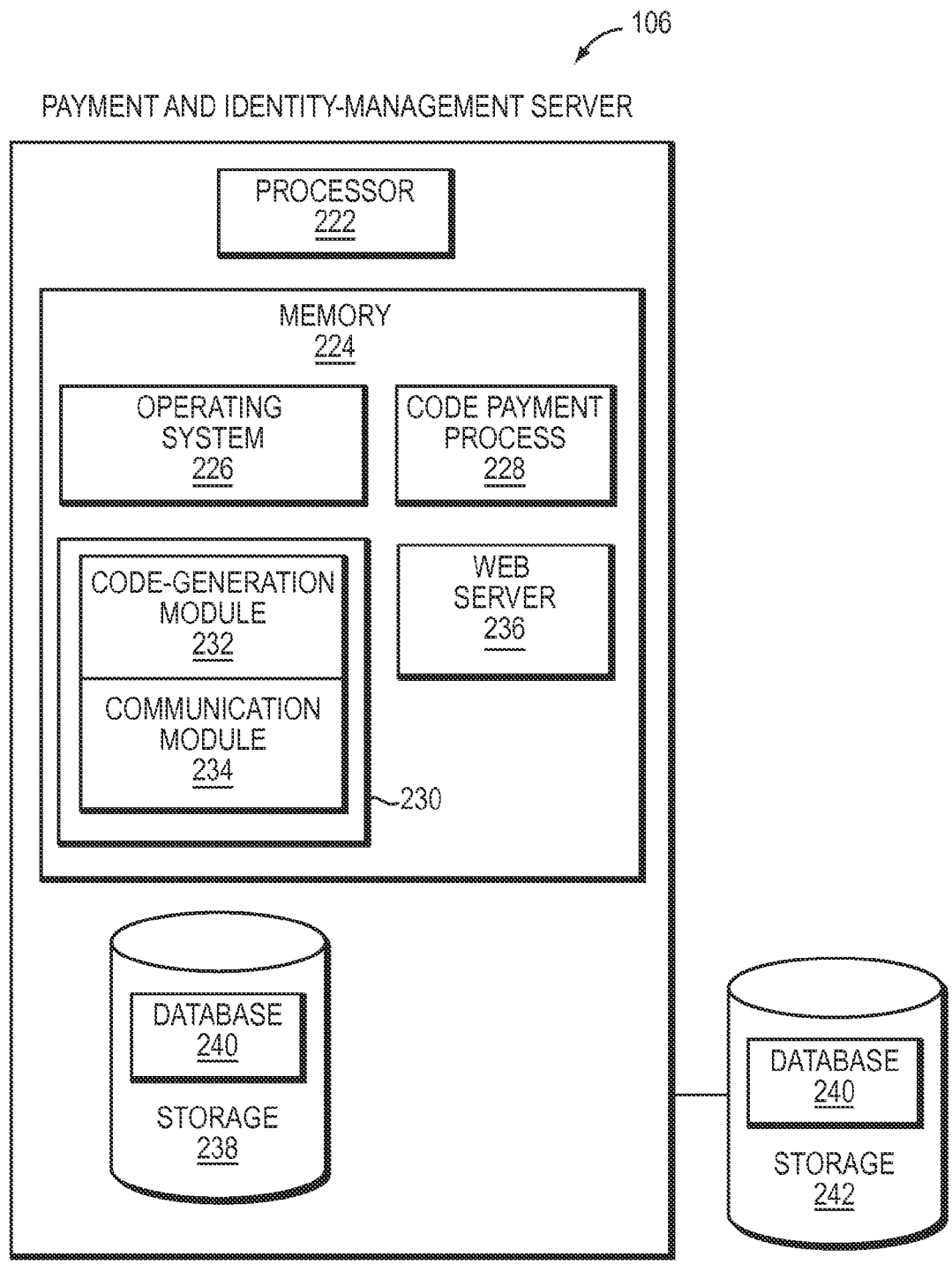

Referring to FIG. 2B, in some embodiments, the payment and identity-management server 106 includes a processor 222, a memory 224 having an operating system 226, a code payment process 228, a service application 230, and a web-server block 236 and a storage device 238. The code payment process 228 implements the server-side functions of facilitating secure mobile payments as further described below. The service application 230, integrating a code-generation module 232 with a communication module 234, generates a unique user identifier and communication with the mobile device 102. More specifically, the code-generation module 232 may generate a unique code tied to the information received from the user via the communication module 234; the generated code may then be transmitted back to the mobile device 102 via the communication module 234. The code-generation module 232 functions similarly to a conventional code-generator that converts the input information into a form that can be readily read or executed by a machine. The communication module 234 may be a conventional component (e.g., a network interface or transceiver) designed to provide communications with a network, such as the Internet and/or any other land-based or wireless telecommunications network or system, and, through the network, with the mobile device 102. To enable the handling of requests from the mobile device 102, the memory 224 contains a web-server block 236, which can be a conventional web server application executed by the processor 222. The payment and identity-management server 106 may include a user database 240 that resides in the storage device 238 and/or an external mass-storage device 242 accessible to the payment and identity-management server 106; the user database 240 stores, for example, a record of each registered user and a readable code or signal. The readable code may be a mature code (e.g., a QR code or a bar code), a seed code that can generate a mature code later, or an authentication token. In one embodiment, the readable code is unchangeable. In another embodiment, the readable code is reset periodically (e.g., in a predetermined period of time) for security purposes or upon receiving a request from the user.

Figure 3A:
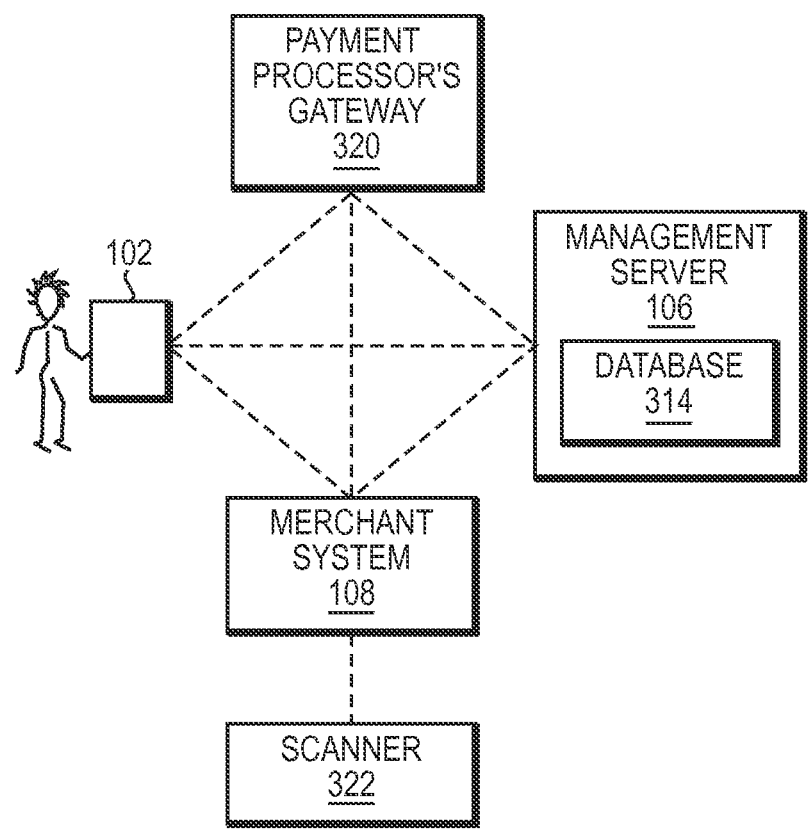
FIG. 3A depicts an exemplary system for performing secure payment transactions in accordance with an embodiment of the invention.

Referring to FIG. 3A, in various embodiments, payment transactions in accordance herewith include or consist of three phases: an activation phase 302, a registration phase 304, and a use phase 306. In the activation phase, the user U first provides identifying information to the management server 106 using, for example, a mobile device 102. The code-generation module 232 of the management server 106 then generates a unique user identifier tied to an account created for the user U; the user's account, in turn, may be represented by a record in a user database 314 maintained by the management server 106. The user record includes, for example, the transmitted user information and/or generated user identifier, as well as other information (name, address, wireless phone number, or any information listed in FIG. 3B) uniquely identifying the user; the user record may be part of, or include a pointer to, the user's financial account information. In some embodiments, the unique user identifier is a seed code utilized to generate a unique mature code (e.g., a QR code or other codes) that can be captured by, for example, a merchant's POS terminal 108. In one embodiment, the generated unique mature code is stored in the database 314 and successively transmitted to the user's mobile device 102 via, for example, wireless cell phone communication, ultrasound, Bluetooth, near-field communication, Internet, or a mobile application. In another embodiment, the unique mature code is directly sent to the mobile device 102 without being stored in the database 314. This unique mature code may be later presented to the merchant system 108 when the user U purchases goods or services, as further described below. Because the mature QR code maps to the user's identity information stored in the database 314 only and contains no information about any user's payment tokens (e.g., credit or debit card information) or payment instrument data, hacking the management server 106 alone cannot provide sufficient information to conduct a fraudulent payment. Additionally, the unique identifier may be used as a seed to generate a multitude of QR codes all of which can be decoded back to a single unique QR code, allowing for new QR codes to be generated and pushed to the mobile device 102 on a periodic, per-transaction or time-out basis; the same key, generated with respect to the unique QR code, can be used to validate any of these additional QR codes. In addition, the QR code may be reset upon receiving a request from the user, for example, at the beginning of each transaction; this further prevents a fraudulent use of the QR code. Although the discussion herein focuses on QR codes for purposes of illustration, the present invention is not limited to any particular form of code. In addition, any suitable mechanism for representing and transferring the code derived from a seed code may be used. For example, ultrasound, Bluetooth, NFC or other communication media besides visual representation and automated recognition may be used and are within the scope of the current invention.

In the registration phase, the user registers a payment instrument (e.g., a credit card, a bank account, or a pre-loaded payment card) to her user account. In a representative transaction flow, the user U first issues a registration request to the management server 106 using the mobile device 102. The management server 106 responds to the request with a registration form (e.g., in the form of a web page), which is displayed on the mobile device 102 in a manner that permits the user U to enter information identifying the payment instrument to be registered. In one embodiment, the registration form includes a client-side script that directly submits the data entered by the user to a third-party payment processor's gateway 320 over, for example, a secure sockets layer (SSL) connection. The user-entered data is stored in or by the third-party payment gateway 320, which also generates a "redirect" uniform resource locator (URL) that includes the Internet address of the management server 106 and a token that identifies the payment instrument, but which does not identify the user U. When the user submits the entered registration data, the client-side script causes a request for the redirect URL also to be transmitted to the gateway 320. When the redirect URL arrives at the mobile device 102 and is processed by the user's browser, it redirects the browser back to the management server 106 without displaying any content, thus creating the impression that the user has never left the management server site. In another representative transaction flow, the user U transmits information about the payment instrument to the management server 106 using the mobile device 102. The management server 106 encrypts the received information with a one-way key and passes the encrypted data to the third-party payment gateway 320. The third-party gateway 320, which is the only party having the key to decrypt the date in the transaction, generates a token that identifies the registered payment instrument. The generated token is transmitted back to the management server 106 and stored therein for transacting future payments. Because the data including a user's identity and payment instrument are separately stored in the management server 106 and the third-party payment gateway 320, respectively, unauthorized access to any one of the records therein is insufficient to initiate a payment transaction under the user's name; this, again, ensures the security of the mobile payment.

In various embodiments, the token generated by the third-party payment gateway 320 is transmitted to the management server 106. The management server 106 associates the token with the user's account record and stores it in the database 314 as a payment identifier. Upon receiving a payment request from the user U, the management server 106 uses the stored token to initiate the payment transaction through the third-party payment gateway 320, against the payment instrument previously submitted, without ever having knowledge or possession of the payment-instrument data itself. Since the payment-instrument data is not stored and cannot be obtained by the management server 106, this approach, again, prevents fraudulent payments.

In the use phase, the management server 106 executes the instructions of the code payment process 222 and transmits a QR code to the user's mobile device 102 for presentation to a merchant; as noted above, the QR code may be revised periodically for security purposes, and is typically generated using encryption based on user-specific information in the database 314. A payment transaction is initiated when the user presents the QR code stored in the mobile device 102 to the merchant system 108. The merchant system 108 may scan the code using, e.g., a POS integrated scanner 322, and thereupon transmits the scanned data along with the payment amount to the management server 106. Thus, at the time of the payment transaction, neither the merchant 108 nor the user U has access to the underlying payment instrument; the QR code merely identifies the user. Further, in the case of a QR code that resets, even an image of the presented QR code may not be used again for future payments (as the user would by then have a new QR code).

In various embodiments, upon receiving the QR code and payment amount from the merchant system 108, the management server 106 decodes the QR code and matches the information therein to the user's record stored in the database 314. The management server 106 then retrieves the stored payment token associated with the user's account and passes the token and the amount to be charged to the third-party gateway 320 for authorizing a payment. The third-party payment gateway 320 authorizes and processes (or rejects) the payment request against the payment instrument corresponding to the token, and creates an associated transaction identifier or rejection code. The created identifier or code may be sent to the management server 106 for re-transmission to the merchant system 108, or may instead be sent directly to the merchant system 108 to complete the transaction. Where the created identifier is first handled by the management server 106 before transmittal to the merchant system 108, the management server 106 may generate and provide additional information (e.g., tracking information) to the merchant system 108 to enable a closed-loop environment of consumer information—e.g., effectiveness of advertisement, consumer demographics, and referral information. Again, because none of the user's mobile device 102, the merchant system 108, the management server 106, or the third-party gateway 320 possesses both user identity information and the underlying payment instrument, this triple-blind payment system provides high security for the user's identity and privacy; accordingly, the possibility of financial losses for the customer is minimized during an m-payment transaction in accordance herewith.

Figure 4A:
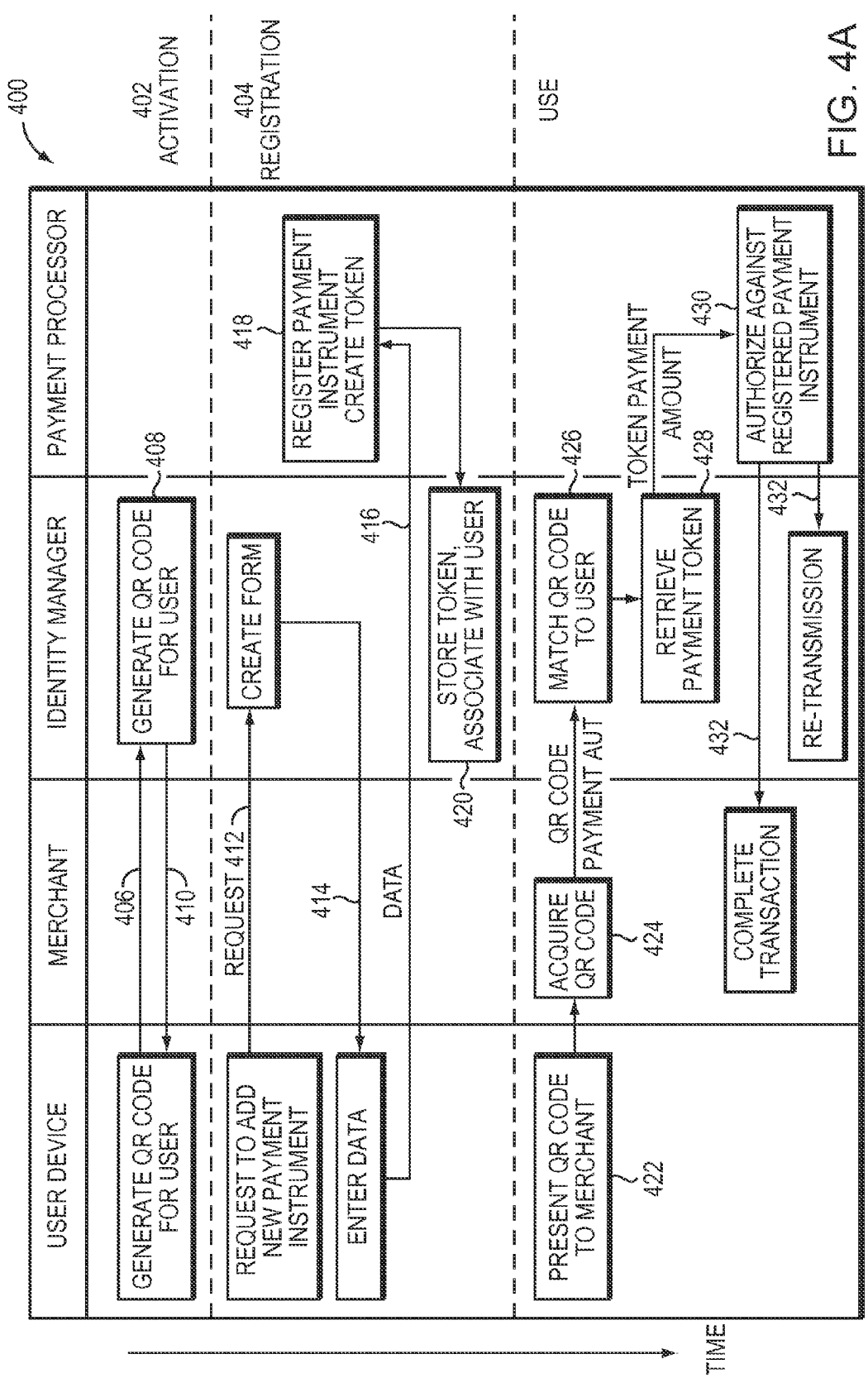
FIGS. 4A and 4B are workflow diagrams illustrating performance of secure payment transactions in accordance with an embodiment of the invention.
Figure 4B:
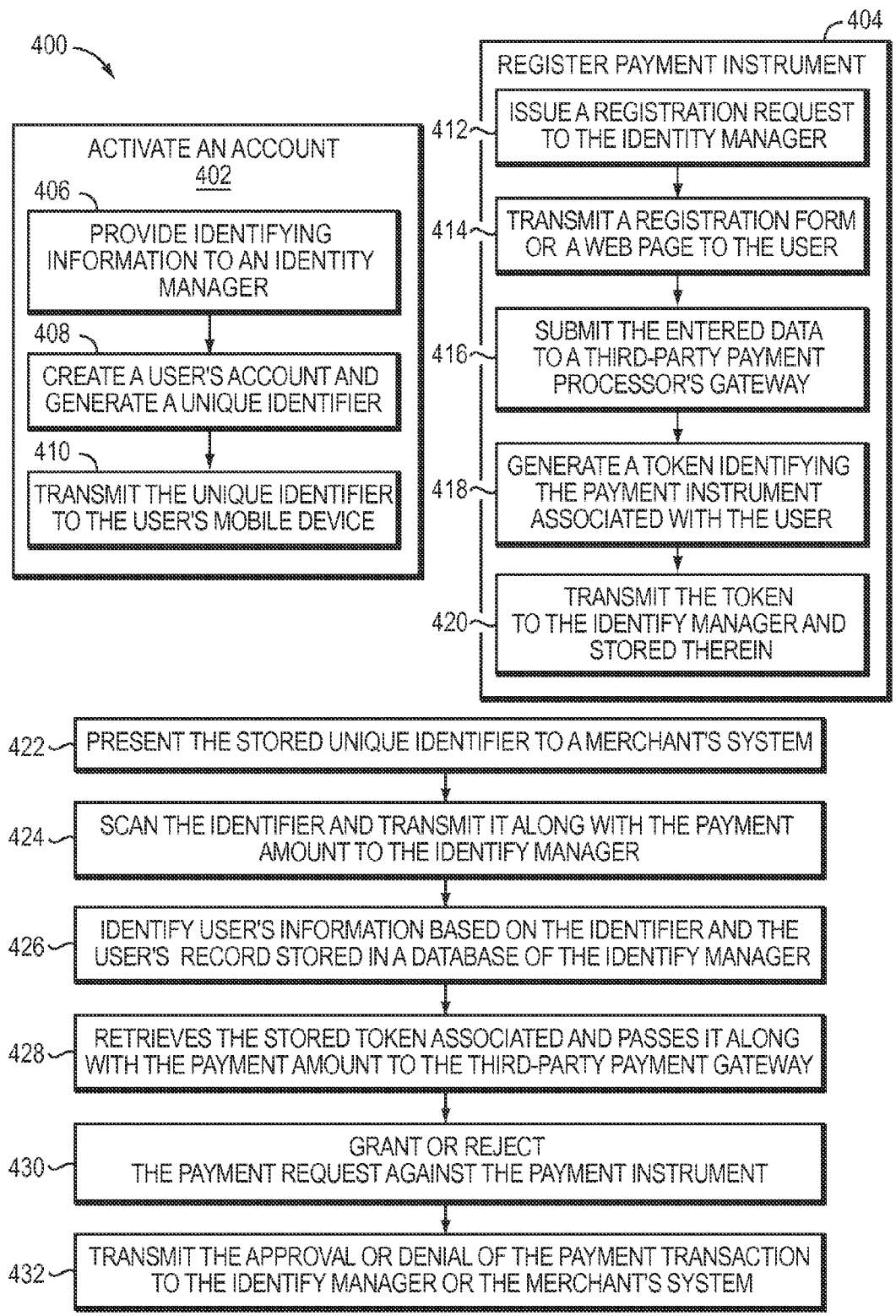

A representative method 400 for safely transacting a payment in accordance with embodiments of the current invention is shown in FIGS. 4A and 4B. Prior to initiating a payment transaction, the user activates her account (step 402) and register her payment instrument (step 404). In some embodiments, the user activates the account by first providing the identifying information to an identity manager using, for example, a mobile device (step 406). The identity manager then creates a user account record in a database; the record contains the obtained identifying information. The identity manager also generates a unique identifier (e.g., a QR code) tied to the account (step 408) and transmits this unique identifier to the user (step 410). The identifier is stored in the user's mobile device for initiating a future payments. To register the payment instrument, the user first issues a registration request to the identity manager (step 412). Upon receiving the request, the identity manager responds with a registration form (e.g., in the form of a web page) in which the user can enter information about the payment instrument (step 414). A client-side script accompanies the registration form and, when executed, the script causes the user-entered data to be submitted directly to a third-party payment processor's gateway (step 416). The third-party payment gateway then generates a redirect URL having the Internet address of the identity manager and a token identifying the payment instrument associated with the user (step 418). When the user's browser follows the redirect URL, the generated token is transmitted to the identity manager and stored therein for transacting future payments (step 420). When the user purchases goods or services from a merchant, the user presents the stored QR code to the merchant's system using the mobile device (step 422). The merchant's system scans the QR code and transmits it along with the payment amount to the identity manager (step 424). The identity manager identifies the user's information based on the QR code and the user's database record (step 426). The identity manager then retrieves the stored payment token associated with the user's account and passes it along with the payment amount to the third-party payment gateway for payment authorization (step 428). The third-party payment gateway may grant or reject the payment request against the payment instrument (step 430). The approval or denial of the payment transaction may be sent from the third-party payment gateway to the identity manager for re-transmission to the merchant's system or directly to the merchant's system to complete the transaction (step 432). While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein.

For example, the method of identifier transferred from the customer to the merchant may be irrelevant. The transfer may include a scan of a bar code, a scan of a QR code, a NFC scan, an audio transmission, a video transmission, an IR transmission, a manual input of a code, and so forth.

More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. In addition, the terms like "user equipment," "mobile station," "mobile," "communication device," "access terminal," "terminal," "handset," and similar terminology, refer to a wireless device (e.g., cellular phone, smart phone, computer, PDA, set-top box, Internet Protocol Television (IPTV), electronic gaming device, printer, and so forth) utilized by a user of a wireless communication service to receive or convey data, control, voice, video, sound, gaming, or substantially any data-stream or signaling-stream. The foregoing terms are utilized interchangeably in the subject specification and related drawings. The terms "component," "system," "platform," "module," and the like refer broadly to a computer-related entity or an entity related to an operational machine with one or more specific functionalities. Such entities can be hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

The processing unit that executes commands and instructions may be a general purpose computer, but may utilize any of a wide variety of other technologies including a special purpose computer, a microcomputer, minicomputer, mainframe computer, programmed microprocessor, micro-controller, peripheral integrated circuit element, a CSIC (customer-specific integrated circuit), ASIC (application-specific integrated circuit), a logic circuit, a digital signal processor, a programmable logic device, such as an FPGA (field-programmable gate array), PLD (programmable logic device), PLA (programmable logic array), RFID processor, smart chip, or any other device or arrangement of devices that is capable of implementing the steps of the processes of the invention.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The mobile device 102 acts as a gateway for transmitting the user's data to the network 104. The mobile device 102 can support multiple communication channels for exchanging multimedia and other data with the servers 106,110 and other devices using a Wi-Fi LAN (e.g., IEEE 802.11 standard) for Internet access, a short-range Bluetooth wireless connection for point-to-point access, and/or an NFC channel for close-proximity access.

The storage devices 238, 242 may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the UNIX operating system, the LINUX operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

The storage devices 238, 242 may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described herein. For example, various forms of the flows shown above may be used, with steps re-ordered, added, or removed. Accordingly, other implementations are within the scope of the following claims.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A server-based method of facilitating payment by a user registered with a server, the method comprising, at the server:
    using a processor to generate, for the user, a code and store the code in a memory;
    transmitting, via a communication module, the code to a mobile device of the user;
    transferring information characterizing a payment instrument from the user to a payment-processing entity utilizing a server routing or a redirect client-side script without storing the payment-characterizing information at the server after completion of the registration;
    receiving, from the payment-processing entity via the communication module, a token encoding the user's account-identifying information;
    using the processor to computationally associate the token with the user;
    receiving, from a merchant device via the communication module, the code and a payment amount;
    using the processor to match the received code to the user and retrieve the token associated with the user; and
    providing the token and the payment amount to the payment-processing entity, via the communication module, to cause completion of a transaction between the user and the merchant,
    wherein providing the code or token alone does not enable completion of the transaction.

2. The method of claim 1 wherein the code is a QR code, a bar code, a radio-frequency identification, a near-field-communication signal, an audio signal, or an infrared signal.

3. The method of claim 1, wherein the code is a seed code that can further generates a unique mature code readable by a merchant device.

4. The method of claim 1 wherein the server comprises a database for storing records, a database record being associated with the user and including user-identifying information, the code or a seed therefor, and the token.

5. The method of claim 1 wherein the mobile device is selected from the group comprising a cellular phone, a smart phone, a computer, a personal digital assistant (PDA), an Internet Protocol Television and an electronic gaming device.

6. The method of claim 1, wherein the code is transmitted from the server to the mobile device via wireless cell phone communication, Internet, ultrasound, Bluetooth, or near-field communication.

7. The method of claim 1, wherein the code is reset, by the server, after a predetermined period of time or upon receiving a request, by the server, from the user.

8. A server for facilitating payment by a user registered with the server, the server comprising:
    a processor;
    a processor-executable code-generation module for generating, for the user, a code;
    a communication module;
    a web server for generating a form-containing web page and associated programming for execution on a client-side computer, the programming being executable to cause transmission of information entered on the form to a payment-processing entity utilizing a server routing or a redirect client-side script without storing the entered information at the server after completion of the registration; and
    a database for storing a token received from the payment-processing entity via the communication module and associating the token with the user;
    wherein the processor is configured to:
    (i) operate the communication module to cause the code to be transmitted to a mobile device of the user, (ii) operate the communication module to receive, from a merchant, the code and a payment amount, (iii) match the received code to the user and retrieving the token associated with the user, and (iv) following the match, operate the communication module to provide the token and the payment amount to a payment processor to cause completion of a transaction between the user and the merchant, and
    further wherein providing the code or token alone does not enable completion of the transaction.

9. The server of claim 8 wherein the transmitted form is configured to receive information characterizing a payment instrument.

10. The server of claim 8 wherein the code is a QR code, a bar code, a radio-frequency identification, a near-field-communication signal, an audio signal, or an infrared signal.

11. The server of claim 8, wherein the code is a seed code for generation, by the code-generating module, a unique mature code readable by a merchant device.

12. The server of claim 8 wherein the database comprises a series of stored records, each record being associated with a user and including user-identifying information, the code or a seed therefor, and the token.

13. The server of claim 8, wherein the communication module transmits the code from the server to the mobile device via wireless cell phone communication, Internet, ultrasound, Bluetooth, or near-field communication.

14. The server of claim 8, wherein the code-generation module resets the code after a predetermined period of time or upon receiving a request from the user.

* * * * *